Patented Nov. 23, 1943

2,335,209

UNITED STATES PATENT OFFICE 2,335,209

TREATMENT OF LIQUIDS FROM PAPER-MAKING PROCESSES

Robert B. Booth, Springdale, Conn., assignor to Chemical Construction Corporation, New York, N. Y., a corporation of Maine No Drawing. Application April 5, 1941,
Serial No. 387,067

7 Claims. (Cl. 210—53)

This invention relates to the treatment of waste liquids produced in the manufacture of paper; and more particularly it relates to the froth flotation treatment of these waste liquids.

In the manufacture of paper there are produced at various stages in the process waste waters or liquids of varying compositions. Some of these waste liquids are highly colored and contain suspended materials which prohibit the reuse of the water in further manufacturing steps. Certain other waste waters may contain suspended solids which do not necessarily prohibit the reuse of the water. White water is a waste water obtained in the manufacture of paper representative of the second class referred to above. White water contains suspended solids such as pulp or paper fibers and paper fillers which can be recovered and used in the production of paper. Similarly the water from white water may be recovered and reused in further manufacturing steps. It is seen, therefore, that there are at least two classes of waste water produced in the manufacture of paper. One class of these waste waters are aqueous suspensions containing worthless solid materials and colored substances which would interfere with the use of the water in further manufacturing steps and which might also prohibit the passing of these waste waters into sewage systems, rivers or streams, because of the pollution nuisance. The second class of waste waters produced in the manufacture of paper not only contains valuable paper pulp and paper fillers which are desired to be recovered but the water is also suitable for reuse in further manufacturing steps.

In the past these waste waters have been treated by filtration or sedimentation methods to remove the solids and clarify the water. More recent improvements over the filtration and sedimentation methods, especially in the treatment of white water, embody the use of the so-called "Saveall" machines or apparatus for recovering fibers, clays, and other paper stock. The "Savealls," while they may be improvements over the older methods, are not entirely satisfactory as they are frequently complicated mechanisms occupying a large amount of floor space and are oftentimes expensive to operate.

In accordance with the present invention a relatively simple method for the clarification and recovery of paper stock and fillers from white water is provided and which removes a high percentage of solids, is less expensive to install, maintain, and operate than the methods and apparatus employed heretofore.

In carrying out the present invention waste waters from the manufacture of paper, containing suspended solids and/or colored colloidal materials are subjected to a froth flotation treatment in the presence of an improved reagent combination which results in the recovery of a high percentage of the solids while at the same time eliminating the colloidal colored materials. The invention is especially useful for the recovery of paper stock and/or clays and/or carbonate fillers from white water. The reagent which I employ for carrying out the invention comprises a product obtained by neutralizing talloel acids with ammonia. The reagent hereafter in the specification and claims will be referred to as ammoniated talloel or ammonium soap of talloel. The ammoniated talloel is an ideal reagent for use in the froth flotation treatment of the waste water obtained in the manufacture of paper and permits considerable flexibility in carrying out the operation. For example, most of the waste water when subjected to a froth flotation treatment in the presence of a small amount of ammoniated talloel as the sole reagent results in a high recovery of solids. On the other hand, some waste water produces a very voluminous froth and when treating these waters it is desirable that a froth controlling substance, such as kerosene or other aliphatic petroleum hydrocarbon, be used in conjunction with the ammoniated talloel. In the clarification of waste waters containing colloidal colored impurities it is frequently desirable that coagulents, such as alum, be added and the flotation then carried out using ammoniated talloel.

While any froth flotation apparatus is suitable for carrying out the present invention I have found that the Fagergren type flotation machine is particularly well suited for the operation. The excellent results obtained by this machine are due in part to its efficient aeration capacity. In a preferred embodiment of the present invention the solids are removed from waste water obtained in the manufacture of paper by subjecting the waste water to a froth flotation treatment in a Fagergren flotation machine and using ammoniated talloel as the flotation reagent. This combination not only speeds up the flotation process but also increases the quantities of recovered solids and the clarified waters are suitable for reuse in the production of paper.

The many advantages resulting from the process of the present invention will be readily apparent to those skilled in the art. Some of the outstanding advantages are set forth hereafter. One of the outstanding advantages of my process is that it can be used economically for the treatment of white water from individual paper machines. For example, paper machines, and particularly those producing small batches of paper, may require alterations in the constituents of the water employed depending upon the type and grade of paper being produced. In the past the white water from several paper machines is frequently passed to one and the same recovery system and hence the solid materials recovered are not representative of any individual white water produced by a single machine. The process of the present invention permits each paper making unit to have its own recovery system using my improved flotation reagent and process to result in a high recovery of paper fiber and fillers employed in the particular paper machine, and hence eliminates contamination with various types of solid materials from other paper machines. This is particularly advantageous when several paper machines in one and the same paper plant are producing several different kinds of paper and cause the waste waters to be passed to one and the same recovery system.

It is also an advantage that my process may be used to treat the final effluent from paper plants or paper making processes before such waste products are passed to rivers and streams. The use of ammonium soap of talloel or ammonium soap of talloel in conjunction with kerosene or other aliphatic hydrocarbons obtained from petroleum or alum definitely reduces the solid content of the waste products and the liquid portion may be passed into rivers and streams without danger of pollution, and in many instances the water is sufficiently free from contaminants and may be reused in paper making operations.

A further advantage of the invention is that the water from various operations in the making of paper which has been collected in a settling basin where the solids are allowed to settle before disposal can be treated by my process very economically. Frequently these waste liquors contain high percentages of colloidal material which settle out with difficulty and in many instances these colloidal materials may contaminate rivers or streams into which they are passed. My improved flotation process using ammonium soap of talloel alone or in combination with other materials now used in paper making have been found to be effective for breaking and removing these colloidal suspensions from such liquors. The flocculated colloidal material is readily floated off by the action of the reagent and the resulting clarified water may be in many instances reused in various paper making operations or it may be passed to waste without danger of contaminating rivers or streams. The flotation treatment introduces appreciable quantities of air into these liquids and the aerated liquid is less apt to produce putrefactive substances and is also less apt to be injurious to plant and animal life when passed into the rivers or streams.

The process is in no way limited by the method of addition of the ammonium soap of talloel. The reagent may be added to a conditioning operation prior to flotation or may be added in stages during the flotation operation. Preferably the reagent is used in the form of alcoholic solutions of substantially anhydrous and substantially completely saponified ammonium talloel soap prepared by dissolving talloel in a small amount of alcohol and introducing anhydrous ammonia until the saponification is complete. The solution is a homogeneous, dark amber fluid which readily dissolves in water to give a nearly clear solution. Various alcohols may be used in preparing these solutions, such as for example, anhydrous methanol, isopropanol, butanols, both secondary and tertiary, tertiary amyl alcohol, and the like. Similarly the solutions may vary in concentration, but preferably solutions of higher concentration are employed, that is to say, those containing more than 50% of the ammonium salt of talloel. Solutions containing 80% of the ammonium salt are obtained in anhydrous methanol and 70% solutions are readily obtained in isopropanol, secondary and tertiary butanol, and tertiary amyl alcohols. The term "ammoniated talloel" includes the solutions described above as well as other forms of ammonium salts of talloel acids.

The following examples will serve to illustrate the operation of the process in the treatment of typical waste water.

In the examples the amounts of reagents used are expressed in terms of pounds per ton of waste water.

*Example 1*

A sample of white water containing 0.189 gram solid/liter, consisting of finely divided paper stock, was subjected to agitation and aeration in a Fagergren flotation machine in the presence of 0.17 lb./ton of an ammonium soap of talloel. The time of treatment was two minutes. The clarified effluent from this process contained 0.042 gram solids/liter representing a removal of 77.78% of the solids in the white water.

*Example 2*

A sample of white water containing 1.211 grams solids/liter, consisting of paper stock and a calcium carbonate filler, was treated as described in Example 1 for 3.5 minutes with 0.22 lb./ton of an ammonium soap of talloel and 0.3 lb./ton $Al_2SO_4.18H_2O$. The clarified effluent from this treatment contained 0.053 gram solids/liter. This indicates that 95.62% of the solids were removed from the white water by this treatment.

*Example 3*

Samples of white water containing 1.422 grams solids/liter, consisting of paper stock and a clay filler, were subjected to agitation and aeration in a Fagergren flotation machine as described in Example 1. In Test A the treatment time was three minutes with 0.28 lb./ton of an ammonium soap of talloel; in Test B, 3 minutes with 0.28 lb./ton of an ammonium soap of talloel and 0.3 lb./ton $Al_2SO_4.18H_2O$; in Test C, 2 minutes with 0.07 lb./ton kerosene and 0.22 lb./ton of an ammonium soap of talloel; in Test D, 3 minutes with 0.3 lb./ton of saponified talloel and 0.3 lb./ton $Al_2SO_4.18H_2O$. The results of these tests are presented in the following table:

| | Test | | | |
|---|---|---|---|---|
| | A | B | C | D |
| Solids—grams per liter of white water | 1,422 | 1,422 | 1,422 | 1,422 |
| Solids—grams per liter of effluent | 0.088 | 0.088 | 0.112 | 0.163 |
| Per cent of solids removed by flotation | 93.81 | 93.81 | 92.12 | 88.54 |

The data presented in the above examples indicate that white water containing paper stock and/or clay and/or calcium carbonate as fillers may be clarified by froth flotation methods and that the use of ammoniated talloel is particularly applicable for this work.

Example 4

Similar flotation tests were conducted on white water containing paper fiber and clay and calcium carbonate fillers. In these tests 2400 cc. of white water were treated with various reagents as shown in the following table and floated in a laboratory Fagergren flotation machine. The results of this series of tests indicate that the major portion of the suspended solids was removed by this flotation treatment.

| Feed | Test No. | Reagent used | Effluent Vol., cc. | Lbs. solids per 1,000 gals. |
|---|---|---|---|---|
| SERIES A | | | | |
| 2400 cc. 1.51 lbs. solids per 1,000 gals. | 1 | 0.11 lb./ton ammoniated talloel. | 2,260 | 0.64 |
| | 2 | 0.11 lb./ton ammoniated talloel. 0.012 lb./ton kerosene. | 2,350 | 0.64 |
| SERIES B | | | | |
| 2400 cc. 31.99 lbs. solids per 1,000 gals. | 1 | 0.14 lb./ton ammoniated talloel. | 2,200 | 2.77 |
| | 2 | 0.29 lb./ton ammoniated talloel. | 2,260 | 1.71 |
| | 3 | 0.29 lb./ton ammoniated talloel. 0.036 lb./ton kerosene. | 2,280 | 2.44 |
| | 4 | 0.145 lb./ton ammoniated talloel. 0.24 lb./ton $Al_2(SO_4)_3 \cdot 24H_2O$. | 2,110 | 2.18 |
| SERIES C | | | | |
| 24 cc. 18.37 lbs. solids per 1,000 gals. | 1 | No reagents | 2,040 | 4.26 |
| | 2 | 0.14 lb./ton ammoniated talloel. | 2,280 | 1.29 |
| | 3 | 0.29 lb./ton ammoniated talloel. | 2,260 | 0.91 |
| | 4 | 0.70 lb./ton kerosene. | 2,060 | 3.24 |
| | 5 | 0.29 lb./ton ammoniated talloel. 0.33 lb./ton kerosene. | 2,180 | 1.24 |

Series A—white water containing paper fiber.
Series B—white water comtaining paper fiber and clay filler.
Series C—white water containing paper fiber and calcium carbonate filler.

Flotation tests were also carried out on various other types of waste waters, produced in the manufacture of paper, using ammoniated talloel as the flotation reagent and in every instance a high percentage of the solids was recovered and in most instances colored colloidal materials were also removed from the water. For example, a sample of the effluent water from a bleach plant, containing such a large percentage of colloidal organic matter that the water was highly colored, was treated with a small amount of alum and ammoniated talloel and floated in a Fagergren flotation machine. A water exhibiting a high degree of clarity was produced by this treatment and the effluent from the flotation machine was suitable for reuse in paper making operations. This result is particularly significant since the colloidal organic matter was rather stable toward treatment with acid and alum, a method used in the treatment of such waters. A similar test was conducted on a sample of waste water from a compounding basin of a paper mill. This sample was a mixture of all the waste waters produced at this particular plant. Large amounts of alum were required to get a break in the color due to suspended colloidal organic matter. However, flotation treatment of this sample with small amounts of kerosene, ammoniated talloel, and alum produced a liquid of high clarity which was suitable for reuse.

The process of the invention is not strictly limited to the details set forth in the above examples and broadly covers the treatment of any liquid suspension of solids, produced in the manufacture of paper, by froth flotation in the presence of ammonium soap of talloel to effect recovery of the solids or to clarify the liquid.

What I claim is:

1. A process of removing solid materials from waste water produced in the manufacture of paper which comprises subjecting said waste water to a froth flotation treatment in the presence of an amount of an ammonium soap of talloel sufficient to float off the solid materials from the waste water, and removing the solid materials concentrated in the froth.

2. A process of removing solid materials from waste water produced in the manufacture of paper which comprises subjecting said waste water to a froth flotation treatment in the presence of an amount of a reagent combination comprising an ammonium soap of talloel and kerosene sufficient to float off the solid materials from the waste water, and removing the solid materials concentrated in the froth.

3. A process of removing solid materials from waste water produced in the manufacture of paper which comprises subjecting said waste water to a froth flotation treatment in the presence of an amount of a reagent combination comprising an ammonium soap of talloel and alum sufficient to float off the solid materials from the waste water, and removing the solid materials concentrated in the froth.

4. A process of recovering paper stock and paper fillers from white water which comprises subjecting waste water to a froth flotation treatment in the presence of an amount of an ammonium soap of talloel sufficient to float off the solid materials from the waste water, and removing the paper stock and filler concentrated in the froth.

5. A process of removing colloidal materials from waste water produced in the manufacture of paper which comprises subjecting said waste water to a froth flotation treatment in the presence of an amount of an ammonium soap of talloel sufficient to float off the solid materials from the waste water, and removing the colloidal materials concentrated in the froth.

6. A process of removing colloidal materials from waste water in the manufacture of paper which comprises subjecting said waste water to a froth flotation treatment in the presence of an amount of a reagent combination comprising an ammonium soap of talloel and kerosene sufficient to float off the solid materials from the waste water, and removing the colloidal materials concentrated in the froth.

7. A process of removing colloidal materials from waste water produced in the manufacture of paper which comprises subjecting said waste water to a froth flotation treatment in the presence of an amount of a reagent combination comprising an ammonium soap of talloel and alum sufficient to float off the solid materials from the waste water, and removing the colloidal materials concentrated in the froth.

ROBERT B. BOOTH.